(12) United States Patent
Brown et al.

(10) Patent No.: US 8,807,089 B2
(45) Date of Patent: Aug. 19, 2014

(54) REMOTELY ACTIVATED REWARD DISPENSER

(71) Applicant: Radio Systems Corporation, Knoxville, TN (US)

(72) Inventors: Jeffrey Brown, Knoxville, TN (US); Steven Schrick, Lenior City, TN (US); Matthew Strong, Knoxville, TN (US); John Rowlands, Powell, TN (US)

(73) Assignee: Radio Systems Corporation, Knoxville, TN (US)

( * ) Notice: Subject to any disclaimer, the term of this patent is extended or adjusted under 35 U.S.C. 154(b) by 0 days.

(21) Appl. No.: 13/960,496

(22) Filed: Aug. 6, 2013

(65) Prior Publication Data

US 2014/0033990 A1    Feb. 6, 2014

Related U.S. Application Data

(60) Provisional application No. 61/680,250, filed on Aug. 6, 2012.

(51) Int. Cl.
*A01K 5/00*    (2006.01)

(52) U.S. Cl.
USPC ................................... 119/719; 119/712

(58) Field of Classification Search
USPC .............. 119/719, 712, 718, 720, 721, 51.01, 119/51.02, 711, 908
See application file for complete search history.

(56) References Cited

U.S. PATENT DOCUMENTS

| | | | | |
|---|---|---|---|---|
| 3,204,608 A * | 9/1965 | Snitz | ............................. | 119/54 |
| 3,716,172 A * | 2/1973 | Crippen | ........................ | 222/453 |
| 4,267,799 A * | 5/1981 | Bacon | .......................... | 119/61.2 |
| 4,756,277 A * | 7/1988 | Peng | .......................... | 119/51.11 |
| 4,770,125 A * | 9/1988 | Gold et al. | .................... | 119/53.5 |
| 4,823,738 A * | 4/1989 | Gold | .......................... | 119/51.01 |
| 5,239,943 A * | 8/1993 | Kim | .......................... | 119/51.12 |
| 5,333,571 A * | 8/1994 | Re et al. | ....................... | 119/56.1 |
| 6,273,027 B1 * | 8/2001 | Watson et al. | ................ | 119/712 |
| 6,651,592 B2 * | 11/2003 | Maddox et al. | ............... | 119/720 |
| 6,904,868 B2 * | 6/2005 | Block et al. | ................ | 119/51.12 |
| 6,983,719 B2 * | 1/2006 | Armstrong | ................ | 119/51.02 |
| 7,219,620 B2 * | 5/2007 | Rucker et al. | ............. | 119/51.12 |
| 7,326,059 B2 * | 2/2008 | Habing et al. | ................ | 434/236 |
| 7,334,541 B2 * | 2/2008 | Reiter | .......................... | 119/712 |
| 7,426,901 B2 * | 9/2008 | Turner et al. | ............... | 119/51.02 |
| 7,617,799 B2 * | 11/2009 | Kates | ............................ | 119/712 |
| 7,654,230 B2 * | 2/2010 | Kroll | ............................ | 119/712 |
| 7,861,676 B2 * | 1/2011 | Kates | ............................ | 119/720 |
| 7,878,152 B2 * | 2/2011 | Kroll | ............................ | 119/712 |
| 8,201,522 B2 * | 6/2012 | Kroll | ............................ | 119/712 |
| 8,225,750 B2 * | 7/2012 | Newman | ....................... | 119/707 |
| 8,453,601 B2 * | 6/2013 | Zimmerman | ............... | 119/51.02 |
| 8,578,882 B2 * | 11/2013 | Araujo | ....................... | 119/51.01 |
| 8,596,219 B1 * | 12/2013 | Miller | .......................... | 119/56.1 |

* cited by examiner

*Primary Examiner* — Yvonne Abbott (74) *Attorney, Agent, or Firm* — J. Kenneth Hoffmeister; Merchant and Gould (57) ABSTRACT

A remotely activated reward dispenser. The remote dispenser delivers consumable rewards in response to a trigger signal from a remote triggering device. The reward dispenser uses a two stage delivery system to prevent unintentional release of the consumable reward. A vibration stage moves a portion of the consumable reward from a reservoir to a staging platform without crushing the consumable reward. The second stage transfers the consumable reward from the staging platform to an area accessible by the animal. A vibration damping system reduces the noise generated by the reward dispenser. An adjustable transition varies the feed rate for the consumable reward.

20 Claims, 5 Drawing Sheets

REMOTELY ACTIVATED REWARD DISPENSER

BACKGROUND

Automatic animal feeders that dispense food on a schedule provide an alternative to leaving food out for the animal. Similarly, remote controlled and automated treat dispensers are useful to reward pets for good behavior when the pet owner cannot be present. Conventional automatic feeders and treat dispensers tend to suffer from the same issues involving balancing of portion control, size, complexity, noise, and damage to the food or treats.

Dry animal food, kibble, and dry animal treats tend to break apart easily when subjected to the rough treatment of the mechanical conveyances such as rakes, push arms, revolving doors, and augers to deliver the food or treat to the animal by conventional automatic feeders and treat dispensers. When crushed, the food or treats end up as smaller particles or dust that is not manipuable by the mechanical conveyance and must be cleaned out of the feeder or treat dispenser.

Additionally, many mechanical conveyances employed by conventional automatic feeders and treat dispensers are imprecise and the amount of food or treats dispensed is inconsistent. Often mechanical conveyances that more consistently dispense the proper amount of food or treats add to the size and complexity to the design of the feeder or treat dispenser. Another significant problem with conventional automatic feeders and treat dispensers is the amount of noise produced. Some of the quietest mechanical conveyances are the most likely to damage the food or treats. It is with respect to these and other considerations that the present invention has been made.

BRIEF SUMMARY

Various embodiments of the remotely activated reward dispenser deliver consumable rewards in response to a trigger signal from a remote triggering device. The reward dispenser uses a two stage delivery system to prevent unintentional release of the consumable reward. A vibration stage moves a portion of the consumable reward from a reservoir to a staging platform without crushing the consumable reward. The second stage transfers the consumable reward from the staging platform to an area accessible by the animal. A vibration damping system reduces the noise generated by the reward dispenser. An adjustable transition varies the feed rate for the consumable reward.

The reward dispenser responds to a trigger signal from a remote triggering device to release a consumable reward as a reward for an animal. A reservoir provides storage for a consumable reward, such as dry animal food, dry animal treats, or kibble. The floor of the reservoir is generally bowl shaped and slopes toward a transfer portal located at or near the lowest point of the reservoir. The bowl-like shape reduces the static head pressure that may build up in a column of consumable rewards and cause the reward dispenser to jam.

A staging table is situated below the reservoir. The staging table includes a feed ramp and one or more actuators that operate to move the consumable reward from the reservoir to a location accessible by the animal. In various embodiments, at least one actuator is a vibration generator. To minimize noise and movement of the reward dispenser during operation of the vibration generator, the staging table is vibrationally isolated from the housing.

The first end of the feed ramp is pivotally attached to the staging table. The slope of the feed ramp may be adjusted by moving the position of the second end. The slope of the ramp, in conjunction with the piece size of the consumable reward, controls the feed rate. In various embodiments, the reward dispenser includes at least two sizing cylinders of different diameters. Fitting a piece of the consumable reward to one of the sizing cylinder gives an estimate of the piece size. The slope of the feed ramp may be adjusted based on the piece size.

Starting in the reservoir, the pieces of the consumable reward travel along a downwardly spiraling feed path toward a release portal. The release portal is normally blocked by a trap door to prevent the unintentional dispensing of the consumable reward due to contact with (e.g., shaking or knocking over) the reward dispenser. A door actuator operatively connected to the trap door moves the trap door between an open position and a closed position. To actually dispense the consumable reward, the door actuator opens the trap door and allows the pieces of the consumable reward positioned over the release portal down a chute and through a dispensing portal to an exterior location accessible by the animal.

The gently sloped surfaces and gravity facilitate the downward movement of the pieces of the consumable reward along the feed path. However, the column of the consumable reward is prone to building up of static head pressure that prevents free movement of the pieces of the consumable reward. A vibration generator secured in communication with the staging table produces vibrations that serve to disrupt the static equilibrium and free the consumable reward to travel the feed path. With no moving conveyance directly contacting the consumable reward, no drops of significant height in the feed path, and only vibration of the staging table to agitate the consumable reward, minimal breakage of the consumable reward occurs.

A controller handles processing and general operation of the reward dispenser, such as controlling the operation and sequencing of the actuators. A communication circuit allows the reward dispenser to communicate with the remote triggering device, and, optionally, the animal identification device. In operation, the communication circuit receives the trigger signal generated by the remote triggering device. The controller may use some or all of the information encoded in the trigger signal (e.g., the identity information and any optional additional information) to limit access to the consumable reward to the animal identified in the trigger signal or otherwise customize the operation the reward dispenser. In various embodiments, the reward dispenser includes an audio system to provide an audible positive reinforcement to the animal and/or an audible notification that a consumable reward has been dispensed.

BRIEF DESCRIPTION OF THE DRAWINGS

Further features, aspects, and advantages of the invention represented by the embodiments described present disclosure will become better understood by reference to the following detailed description, appended claims, and accompanying figures, wherein elements are not to scale so as to more clearly show the details, wherein like reference numbers indicate like elements throughout the several views, and wherein:

DETAILED DESCRIPTION

A remotely activated reward dispenser is described herein and illustrated in the accompanying figures. The reward dispenser delivers consumable rewards in response to a trigger signal from a remote triggering device. The reward dispenser uses a two stage delivery system to prevent unintentional release of the consumable reward. A vibration stage moves a portion of the consumable reward from a reservoir to a staging platform without crushing the consumable reward. The second stage transfers the consumable reward from the staging platform to an area accessible by the animal. A vibration damping system reduces the noise generated by the reward dispenser. An adjustable transition varies the feed rate for the consumable reward.

Figure 1:
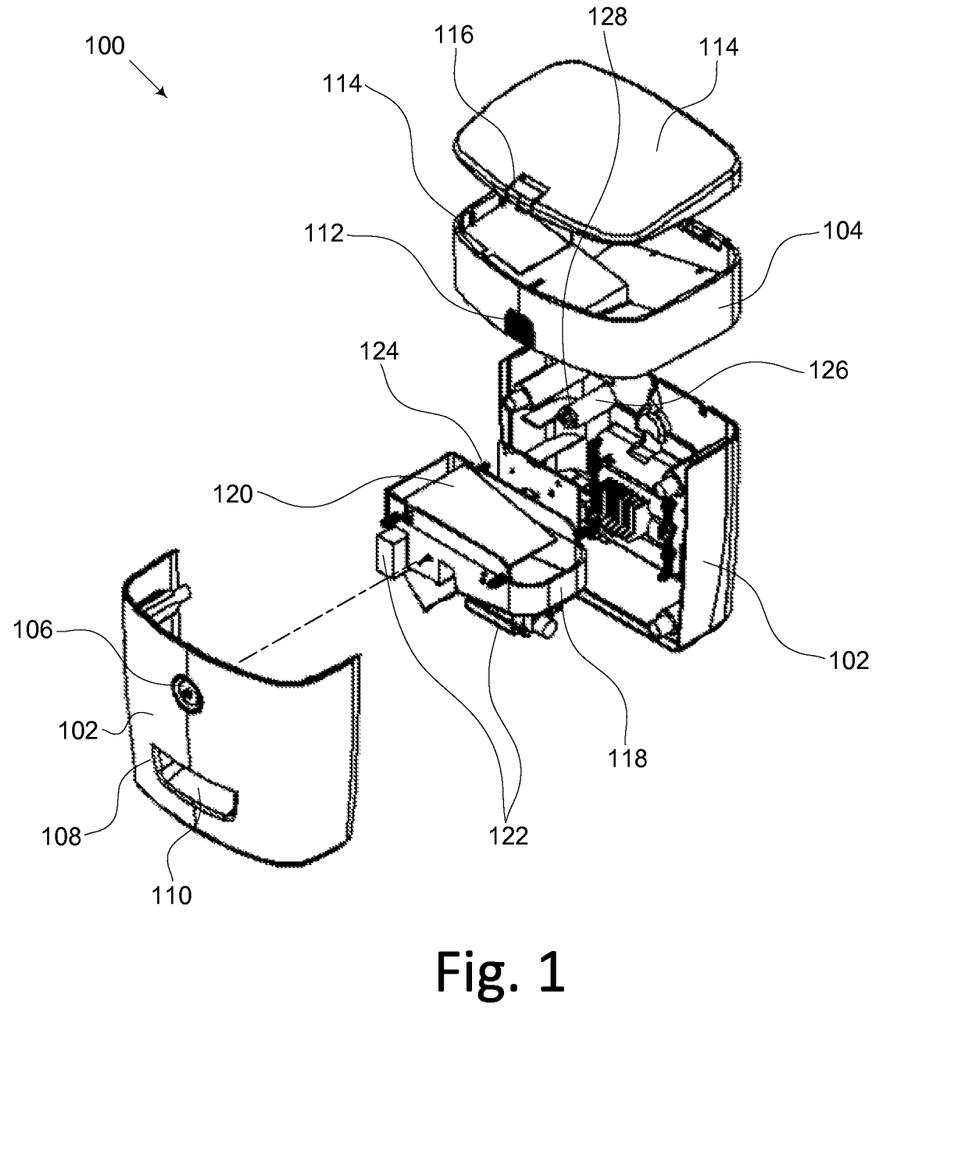
FIG. 1 illustrates an exploded view of one embodiment of the reward dispenser.

FIG. 1 illustrates an exploded view of one embodiment of the reward dispenser 100 providing one or more positive stimuli to an animal. The reward dispenser 100 responds to a trigger single from a remote triggering device to release a consumable reward as a reward for an animal. The remote triggering device may be one of any number of remote triggering devices. In some embodiments, the remote triggering device is handheld transmitter having a manually operable switch that allows the trainer to send a trigger signal to the reward dispenser 100. In other embodiments, the remote triggering device part of an automatic containment or training device such as, without limitation, an electronic animal containment system, an anti-bark collar, or a housebreaking system.

The reward dispenser 100 includes a housing 102 that contains the operating components of the reward dispenser 100 and a reservoir 104 that rests on top of the housing 102. Although shown as a two-part housing 102, other configurations may be used without departing from the scope and spirit of the present invention. The front part of the housing 102 carries a power switch 106 and defines a dispenser opening 108 at the bottom of a chute 110.

A reservoir 104 is supported by the housing 102. The reservoir 104 provides storage for a consumable reward. Examples of suitable consumable rewards for use with the reward dispenser 100 include, but are not limited to, dry animal food, dry animal treats, and kibble. The reservoir 104 is removable for cleaning or filling. In various embodiments, the reservoir 104 is selectively secured to the reservoir 104 by a fastener 112 that cannot be manipulated by the animal (e.g., a latch, threads, or a tight frictional fit). In the illustrated embodiment, the fastener 112 includes an internal latch and release button that disengages the latch to allow removal of the reservoir 104 from the housing 102.

A lid 114 covers the top opening of the reservoir 104 and is selectively displaceable or removable to for filling the reservoir 104. In the illustrated embodiment, the lid 114 is hingedly connected to the reservoir 104. In various embodiments, a fastener 116 selectively secures the lid 114 in a closed position to prevent the animal from opening the reservoir 104 and gaining direct access to the contents of the reservoir 104. In the illustrated embodiment, the fastener 116 is an externally accessible latch for keeping the lid 114 closed.

A staging table 118 situated within the housing 102 below the reservoir 104. The staging table 118 includes a feed ramp 120 and one or more actuators 122 that operate to move the consumable reward from the reservoir 104 and out of the dispenser opening 108 to a location accessible by the animal. In the illustrated embodiment, the staging table 118 is supported by multiple support pegs 124 that engage corresponding openings 126 (e.g., sockets) defined by the housing 102. In various embodiments, at least one actuator is a vibration generator 410. To minimize noise and movement of the reward dispenser 100 during operation of the vibration generator 410, the staging table 118 is vibrationally isolated from the housing 102. In the illustrated embodiment, a vibration damper 128 (e.g., an elastic bushing) is positioned between the rigid support components (e.g., the support pegs and sockets) to minimize or eliminate the transfer of vibrations from the staging table 118 to the housing 102. Alternatively, the staging table 118 may be supported in a web of elastic fibers.

Figure 2:
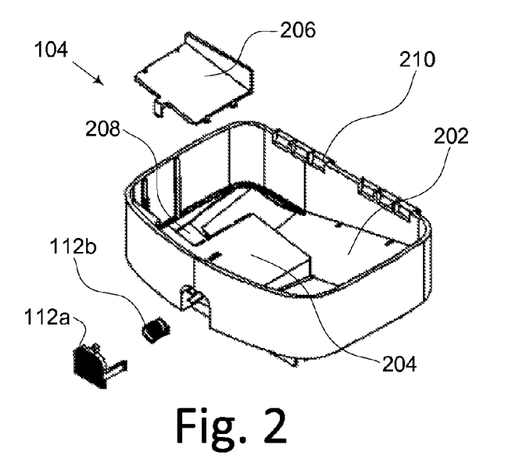
FIG. 2 illustrates an exploded view of one embodiment of the reservoir.

FIG. 2 illustrates an exploded perspective view of one embodiment of the reservoir 104. The floor 202 of the reservoir 104 is generally bowl shaped and slopes toward a transfer portal located at or near the lowest point of the reservoir 104. The bowl-like shape reduces the static head pressure that may build up in a column of consumable rewards and cause the reward dispenser 100 to jam. In the illustrated embodiment, the floor 202 forms a generally downward spiral ending at the transfer portal.

The slope allows the consumable reward to slide to the transfer portal at the lowest point of the reservoir 104 and drop to the staging table 118 below. In the illustrated embodiment, the floor 202 forms a spiral slide with the transfer portal located below the start 204 (i.e., the highest point) of the slide. In various embodiments, the reservoir 104 includes an access panel 206. The access panel is a portion of the floor 202 at start of the slide that is removable to provide access to the end 208 of the slide and the transfer portal. The access panel facilitates clearing jams and cleaning of the reservoir 104. In the illustrated embodiment, the fastener 112 is exploded to show the latch button 112a and the spring 112b forming the spring-loaded latch. Also visible is a portion of the hinge 210 connecting the lid 114 to the reservoir 104.

Figure 3:
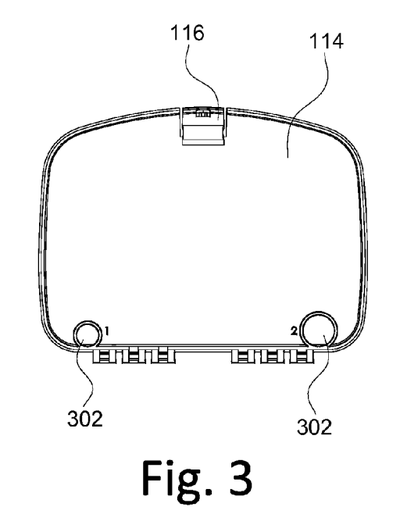
FIG. 3 is a bottom plan view of one embodiment of the lid.

FIG. 3 is a bottom perspective view of one embodiment of the lid 114. In various embodiments, the lid 114 includes at least two sizing cylinders 302 projecting from the inner surface 402. Although referred to as cylinders, other shapes may be used without departing from the scope and spirit of the present invention. Each sizing cylinder 302 is a perimetrical wall with an inside diameter. The inside diameter differs for each sizing cylinder 302. Fitting a piece of the consumable reward to one of the sizing cylinders 302 gives an estimate of the piece size. The slope of the feed ramp 120 may be adjusted based on the piece size.

Figure 4A:
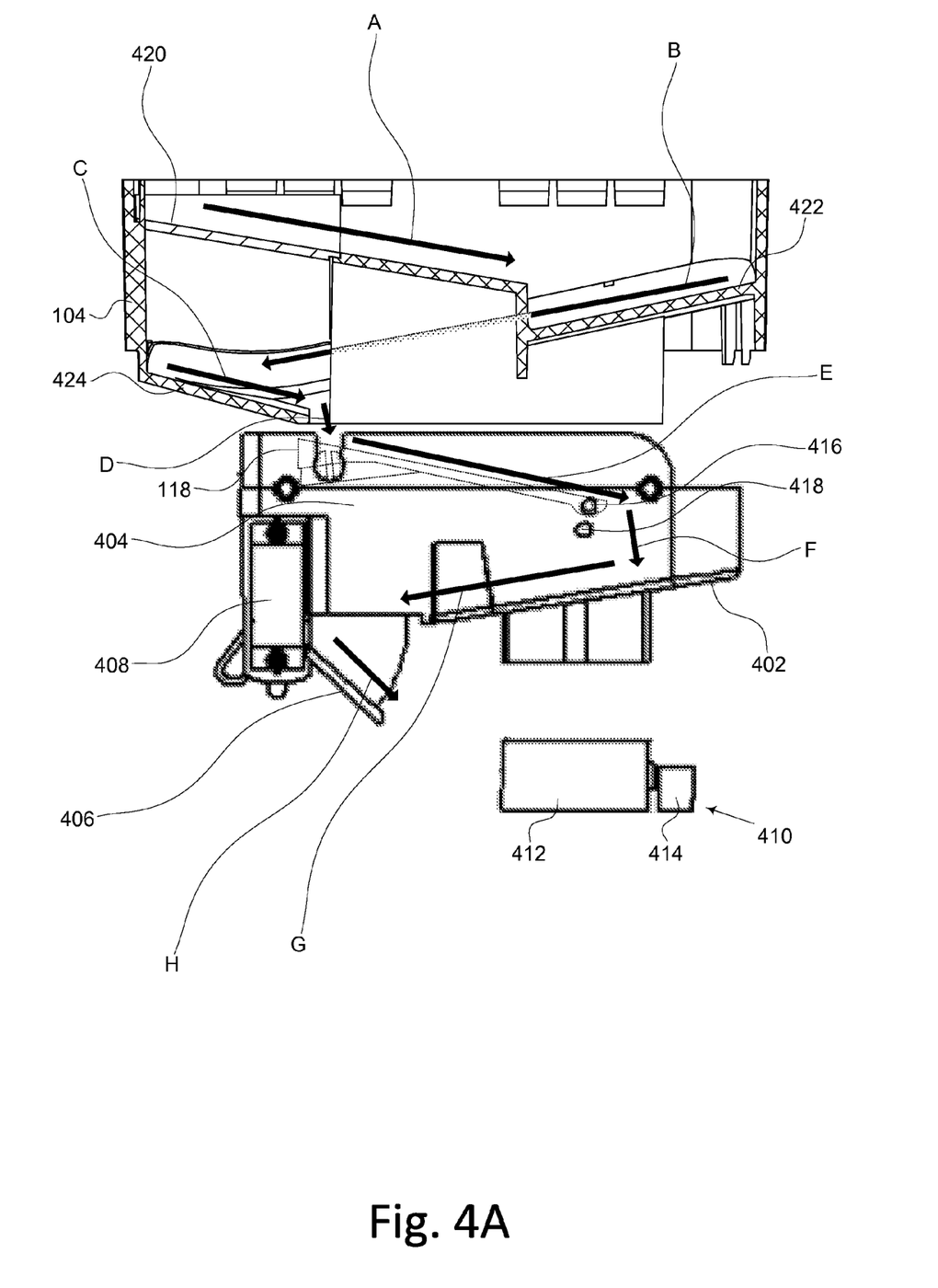
FIG. 4A is a front elevation view of the reservoir and the staging table showing the feed path of the consumable reward as it passes through the reward dispenser from the reservoir to the chute.
Figure 4B:
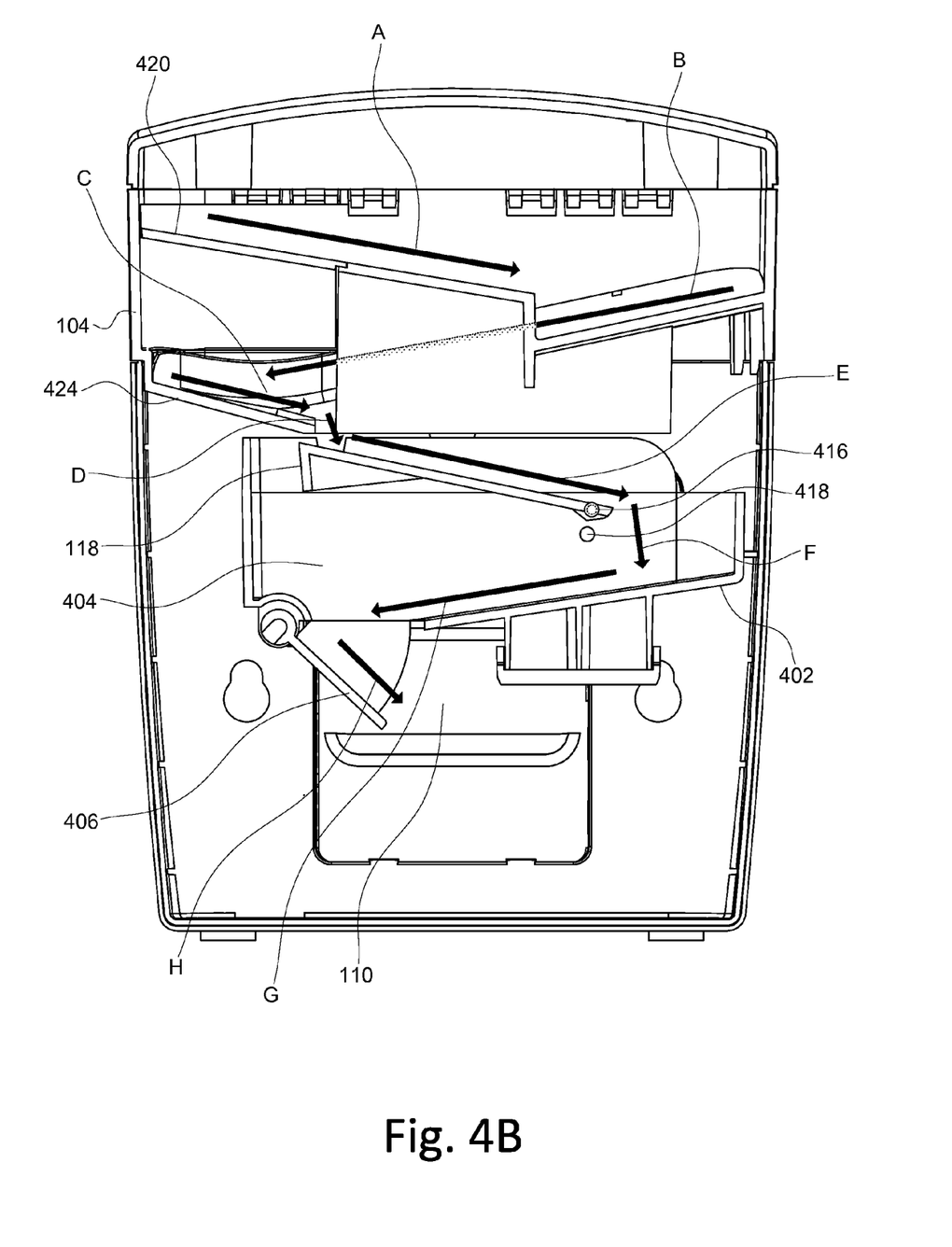
FIG. 4B is a sectional front elevation view of the reward dispenser showing the feed path.

FIGS. 4A and 4B show the feed path of the consumable reward as it passes through the reward dispenser 100 from the reservoir 104 to the chute 110. The reservoir 104 is shown in section and the staging table 118 is shown in an exploded view. The staging table 118 includes a surface 402 bounded by one or more walls 404 to contain the consumable reward. The release portal is normally blocked by a trap door 406. A door actuator 408 (e.g., a servo motor) operatively connected to the trap door 406 moves the trap door 406 between an open position and a closed position. In various embodiments, the trap door 406 doubles as an extension of the chute 110 when the trap door 406 is in the open position. A vibration generator 410 is secured to the underside of the staging table 118. In the illustrated embodiment, the vibration generator 410 is a motor 412 driving an eccentric rotating mass 414.

The first end of the feed ramp 120 (shown in phantom) is pivotally attached to the staging table 118. The second end of the feed ramp 120 is positioned above the surface 402 of the staging table 118 allowing pieces of the consumable reward to pass under the feed ramp 120. The second end of feed ramp 120 is lower than the first end and the slope of the feed ramp 120 may be adjusted by moving the position of the second end. The slope of the feed ramp 120 and/or the clearance between the second end of the feed ramp 120 and the surface 402 of the staging table 118 (i.e., the clearance height) in conjunction with the piece size of the consumable reward, controls the feed rate. To maintain the selected slope, the second end of the feed ramp 120 is securable to the walls 404 of the staging table 118 by a fastener. One embodiment of the fastener includes a peg 416 extending from each side of feed ramp 120 and two vertically offset recesses 418 defined by the walls 404 of the staging table 118 configured to receive the peg 416. In the illustrated embodiment, the peg 416 of the ramp fastener is positioned in the top recess 418 provide additional clearance for a consumable reward with a larger piece size. Generally, the number of recesses corresponds to the number of the sizing cylinders 302. Other types of fasteners may be used to secure the position of the second end of the feed ramp 120 in the selected position.

In various embodiment, the clearance height is the product of the piece size of the corresponding consumable reward and a multiplier ranging from approximately 1.1 to 1.5. In some embodiments, the multiplier ranges from approximately 1.2 to 1.4. In other embodiments, the multiplier ranges from approximately 1.25 to 1.33. In another embodiment, the clearance height is designed to less than approximately one third larger the piece size of the corresponding consumable reward. In yet another embodiment, the clearance height is a fixed increment added to the piece size of the corresponding consumable reward. In one embodiment, the clearance height is approximately 3.2 mm greater than the piece size of the corresponding consumable reward. For example, the clearance height is approximately 12.7 mm (0.5 in) when the feed ramp is adjusted for a consumable reward with a piece size of approximately 9.5 mm (0.375 in) and approximately 15.9 mm (0.625 in) when the feed ramp is adjusted for a consumable reward with a piece size of approximately 12.7 mm (0.5 in).

From the reservoir 104, the pieces of the consumable reward travel along the feed path to the dispensing portal where they are made accessible to the animal. Initially, the pieces of the consumable reward slide down the upper, front section 420 of the floor 202 in the direction of arrow A. The pieces of the consumable reward transition to the rear section 422 of the floor 202 and continue sliding in the direction of arrow B (partially in phantom). At the end of the rear section 422, the pieces of the consumable reward transition to the lower, front section 424 of the floor 202 and slide in the direction of arrow C. At the end of the lower, front section 424, the pieces of the consumable reward drop a short distance through the transfer portal in the direction of arrow D onto the feed ramp 120 and continue sliding in direction of arrow E to the end of the feed ramp 120. At the end of the feed ramp 120, the pieces of the consumable reward again drop a short distance in the direction of arrow F onto the surface 402 of the staging table 118. Once on the surface 402 of staging table 118, the pieces of the consumable reward slide in the direction of arrow G toward the release portal.

To actually dispense the consumable reward, the door actuator 408 opens the trap door 406 and allows the pieces of the consumable reward positioned over the release portal to slide down the trap door 406 in the direction of arrow H onto the chute 110 and pass through the dispensing portal to an exterior location accessible by the animal. In various embodiments, the operation of the door actuator 408 occurs after the operation of the vibration generator 410. In other embodiments, the operation of the door actuator 408 partially or fully coincides with the operation of the vibration generator 410. The door actuator 408 then closes the trap door 406 to prevent the unintentional dispensing of the consumable reward due to contact with (e.g., shaking or knocking over) the reward dispenser 100.

The gently sloped surfaces and gravity facilitate the downward movement of the pieces of the consumable reward along the feed path. However, the column of the consumable reward is prone to building up of static head pressure that prevents free movement of the pieces of the consumable reward. The vibrations produced by the vibration generator 410 serve to disrupt the static equilibrium and free the consumable reward to travel the feed path. With no moving conveyance directly contacting the consumable reward, no drops of significant height in the feed path, and only vibration of the staging table 118 to agitate the consumable reward, minimal breakage of the consumable reward occurs. In various embodiments, the vertical distance of each drop is designed to be less than approximately four times the piece size of the largest consumable reward intended for use (or effectively usable) with the reward dispenser. Examples of suitable approximate maximum values for the vertical distance of each drop include, but are not limited to, 50.8 mm (2 in), 25.4 mm (1 in), and 19 mm (0.75 in). Opening the trap door 406 only after the vibrations have stopped further reduces the likelihood that the consumable reward will still be flowing and crushed as the trap door 406 closes.

Figure 5:
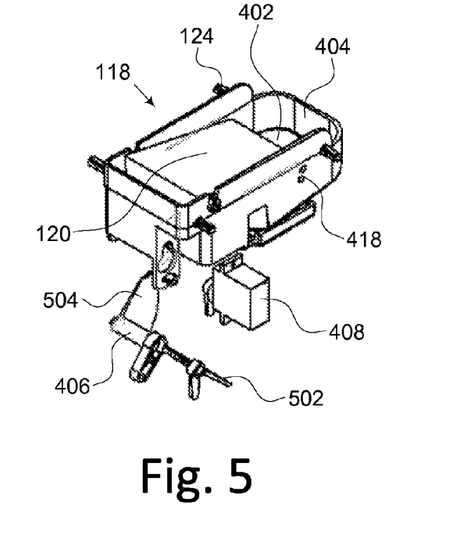
FIG. 5 is a partially exploded perspective view of the staging table.

FIG. 5 is a partially exploded perspective view of the staging table 118 showing details of the trap door 406 and the door actuator 408. The trap door 406 is operatively connected to the motor of the door actuator 408 by drive shaft 502. In some embodiments, the trap door 406 includes a guide wall 504 on one or both sides of the door to contain and guide the pieces of the consumable reward passing through the release portal and sliding along the door panel.

Figure 6:
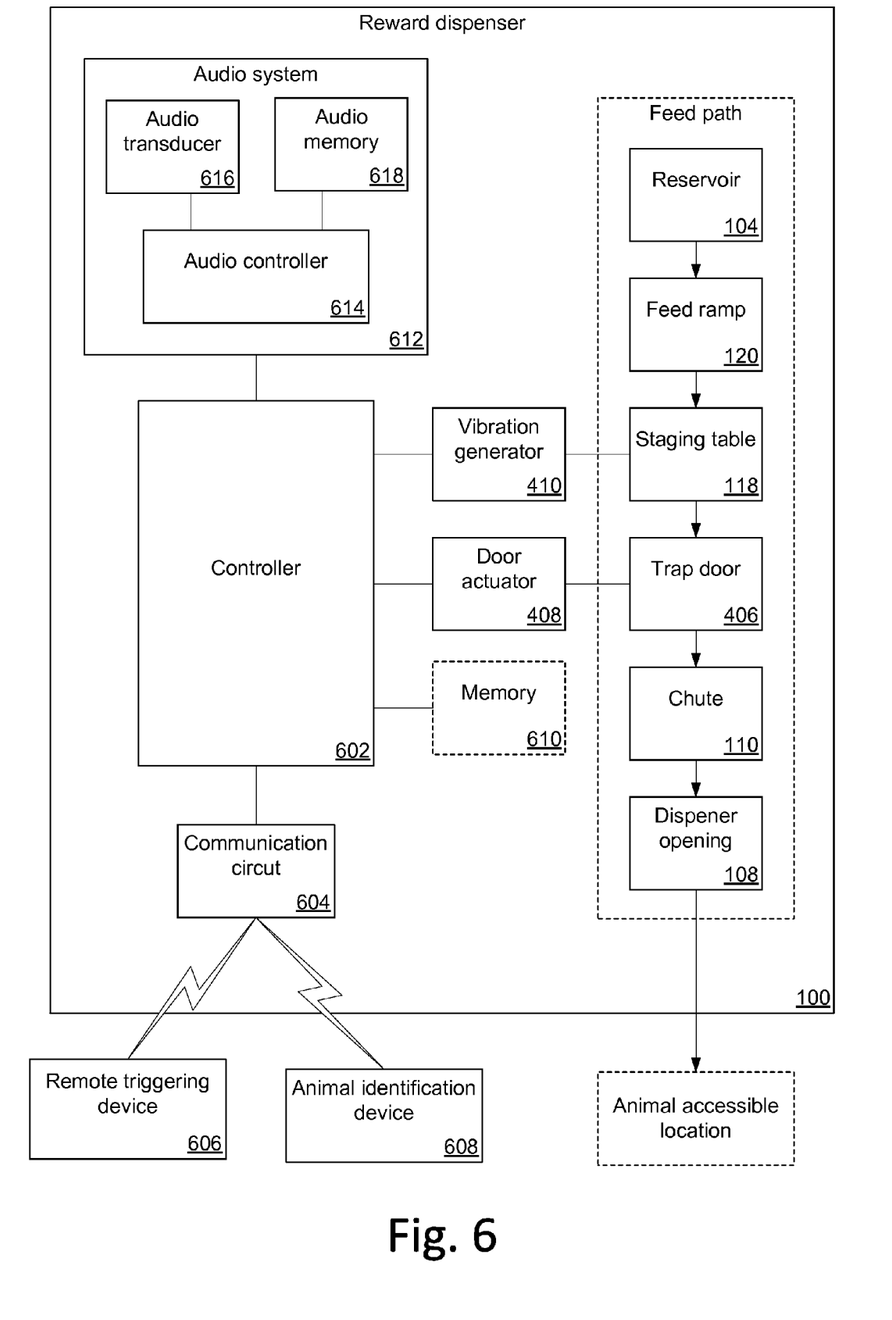
FIG. 6 is a block diagram of one embodiment of the control system of the reward dispenser.

FIG. 6 is a block diagram of one embodiment of the reward dispenser 100. The reward dispenser 100 includes a controller 602 and a communication circuit 604. The controller 602 handles processing and general operation of the reward dispenser 100, such as controlling the operation and sequencing of the actuators 122. The communication circuit 604 allows the reward dispenser 100 to communicate with the remote triggering device 606, and, optionally, the animal identification device 608. The communication circuit 604 includes a transmission component and/or a reception component as required to provide the intended functionality. The transmission component includes a transmitter that modulates the trigger signal and an associated antenna that converts the modulated signal into a radio frequency signal. The reception component includes an antenna for converting a radio frequency trigger signal into currents that are filtered and/or demodulated by a receiver. The communication circuit 604 is described herein as using radio frequency communication circuits; however, those skilled in the art will recognize that other types of communication circuits (e.g., infrared or ultrasonic) may be used without departing from the scope and spirit of the present invention. The communication circuit 604 may also be designed to utilize wired communications.

In operation, the communication circuit 604 receives the trigger signal. The trigger signal is processed by the controller 602 to extract any encoded information. The information encoded in the trigger signal includes some or all of the information including, but not limited to, an identification of the transmitter, an identification of the animal to be reward, and the date and/or time of the trigger signal. In some embodiments, the controller 602 records the information encoded in the trigger signal in a log stored in an optional memory 610. The logged information may later be retrieved by the trainer. In some cases, information such as the date and/or time is provided by the reward dispenser 100 upon receipt of the trigger signal rather than being sent from the remote triggering device 606.

The controller 602 may use some or all of the information encoded in the trigger signal (i.e., the identity information and any optional additional information) to limit access to the consumable reward to the animal identified in the trigger signal or otherwise customize the operation the reward dispenser 100. For example, the reward dispenser 100 may utilize the communication circuit 604 to send an identification request to an animal identification device 610 worn by the animal approaching the reward dispenser 100. The identity information received from the animal identification device 610 is passed to the controller 602 where it is compared to the identity information encoded in the trigger signal. The reward dispenser 100 delivers the reward only when the two identities match to ensure that the correct animal is rewarded. In some embodiments, the controller 602 uses some or all of the information encoded in the trigger signal to customize the issuance, frequency, amount, or type of reward for specific animals. Examples of suitable animal identification devices include, but are not limited to, a transponder or transceiver carried by a collar, a harness, ear tag, or other article worn by or attached to the animal and a microchip implanted in the animal.

In various embodiments, the reward dispenser 100 includes an audio system 612. In some embodiments, the sounds produced by the audio system are used to provide an audible positive reinforcement to the animal. In some embodiments, the audio system audibly notifies the animal that a consumable reward is available. In some embodiments, the audio system is used to deliver both the audible positive reinforcement and the consumable reward availability notification. By providing both an audible positive reinforcement and a consumable reward, the housebreaking reward system provides redundant positive reinforcement. In the event that the reward dispenser 100 is empty or fails to deliver the treat, the animal should still receive the audible positive reinforcement. Similarly, in the event that the audible positive reinforcement fails to play, the animal should still receive the treat.

The audio system includes an audio controller 614 in communication with an audio transducer 616. The audio transducer converts the audio signals into sounds in the frequency ranges audible to the animal. The audio system optionally includes a memory 618 for storing custom audio data, such as a recording of the owner's voice delivering praise, the owner's voice calling the animal to receive a treat, or a particular sound to which the animal naturally responds or to which the animal has been trained to respond. In various embodiments, the audio system optionally includes a microphone to allow the custom audio data to be recorded. In some embodiments, the audio system imports the custom audio data from an external source.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

What is claimed is:

1. A reward dispenser operable from a remotely located transmitter for use in training an animal, the reward dispenser comprising:
    a housing;
    a reservoir for holding a consumable reward, the reservoir defining a transfer portal and a sloped path funneling pieces of the consumable reward toward the transfer portal;
    a staging table carried by the housing, the staging table receiving the pieces of the consumable reward passing through the transfer portal, the staging table comprising a floor defining a release portal;
    a ramp having a first end positioned below the transfer portal and a second end terminating above the floor of the staging table and lower than the first end;
    a vibration generator in physical communication with the staging table;
    a door selectively blocking passage through the release portal, the door moveable between an open position and a closed position;
    a door actuator connected to the door, the door actuator selectively moving the door between the open position and the closed position;
    a receiver responsive to a trigger signal from the remotely located transmitter; and
    a controller in communication with the receiver, the controller activating the vibration generator and the door actuator.

2. The reward dispenser of claim 1 characterized in that the reservoir is selectively securable to the housing.

3. The reward dispenser of claim 1 characterized in that the ramp has an adjustable slope.

4. The reward dispenser of claim 3 characterized in that the staging table further defines a first attachment feature and a second attachment feature, the first attachment feature vertically offset from the second attachment feature, each of the first attachment feature and the second attachment feature configured to operatively engage the second end of the ramp.

5. The reward dispenser of claim 4 characterized in that the first end of the ramp is pivotally attached to the staging table.

6. The reward dispenser of claim 1 characterized in that the reservoir further defines an external access portal, the reward dispenser further comprising:
    a selectively displaceable lid covering the external access portal;
    a first sizing cylinder attached to the lid; and
    a second sizing cylinder attached to the lid, the second sizing cylinder having a different inner diameter than the first sizing cylinder.

7. The reward dispenser of claim 1 characterized in that the housing is substantially isolated from vibrations produced by the vibration generator.

8. The reward dispenser of claim 1 characterized in that the vibration generator comprises a motor driving an eccentric rotating mass.

9. The reward dispenser of claim 1 characterized in that the consumable reward is selected from dry animal food, kibble, and consumable dry treats.

10. The reward dispenser of claim 1 further comprising a dispensing chute carried by the housing, the dispensing chute transferring the pieces of the consumable reward passing through the release portal to a location accessible by an animal.

11. The reward dispenser of claim 1 further comprising an audio system providing a positive audible reinforcement in response to the trigger signal.

12. A reward dispenser for use in training an animal, the reward dispenser responsive to a trigger signal produced by a remote triggering device, the reward dispenser comprising:
- a reservoir for holding a consumable reward having a piece size, the reservoir having bowl-shaped floor defining a transfer portal;
- a staging table positioned below the reservoir, the staging table having a surface sloped downwardly toward a release portal;
- a ramp having an upper end proximate to the transfer portal and a lower end proximate to the staging table, the ramp providing a gradual transition between the transfer portal and the staging table;
- a vibration generator connected to the staging table;
- a door selectively blocking passage through the release portal, the door moveable between an open position and a closed position;
- a door actuator connected to the door, the door actuator selectively moving the door between the open position and the closed position;
- a receiver receiving the trigger signal from the remote triggering device; and
- a controller in communication with the receiver, the vibration generator, and the door actuator.

13. The reward dispenser of claim 12 characterized in that, after the trigger signal is received, the controller activates the vibration generator to impel movement of the consumable reward to the release portal and, after stopping the vibration generator, activates the door actuator to dispense the consumable rewards to the animal.

14. The reward dispenser of claim 12 characterized in that the lower end of the ramp is selectively positionable to vary the height between the lower end of the ramp and the floor of the staging table.

15. The reward dispenser of claim 12 characterized in that the lower end of the ramp has a first position at a first height above the floor of the staging table and a second position at a second height above the floor of the staging table, the second height being greater than the first height.

16. The reward dispenser of claim 12 characterized in that:
- the staging table further defines a first opening at a first height above the surface and a second opening at a second height above the surface; and
- the lower end of the ramp includes a peg adapted to be selectively inserted into either of the first opening or the second opening.

17. The reward dispenser of claim 12 characterized in that the upper end of the ramp is pivotally connected to the staging table.

18. The reward dispenser of claim 12 characterized in that the distance between the transfer portal and the upper end of the ramp is less than the piece size of the consumable reward.

19. The reward dispenser of claim 12 characterized in that the clearance between the lower end of the ramp and the floor of the staging table is between 1.1 and 1.5 times the piece size of the consumable reward.

20. The reward dispenser of claim 12 characterized in that staging table is attached within the reward dispenser using a vibration dampener.

\* \* \* \* \*